(12) United States Patent
Gutkin (10) Patent No.: US 6,436,579 B1
(45) Date of Patent: Aug. 20, 2002

(54) ELECTRICAL ENERGY GENERATION

(75) Inventor: Timofei Gutkin, Hamburg, NJ (US)

(73) Assignee: Renal Tech International LLC, New York, NY (US)

( * ) Notice: Subject to any disclaimer, the term of this patent is extended or adjusted under 35 U.S.C. 154(b) by 0 days.

(21) Appl. No.: 09/553,354

(22) Filed: Apr. 21, 2000

(51) Int. Cl.[7] .................................................. H01M 4/72
(52) U.S. Cl. ........................................ 429/233; 429/237
(58) Field of Search ................................ 429/243, 161, 429/233, 234, 237, 238, 239

(56) References Cited

U.S. PATENT DOCUMENTS

| | | | | |
|---|---|---|---|---|
| 1,585,760 A | * | 5/1926 | Burnett et al. ............ | 429/223.4 |
| 3,226,262 A | * | 12/1965 | Rohrback et al. ............ | 429/210 |
| 5,593,797 A | * | 1/1997 | Brecht ......................... | 429/210 |
| 5,993,494 A | * | 11/1999 | Malikayil .................. | 29/623.5 |
| 6,017,653 A | * | 1/2000 | Petrakovich et al. ........ | 429/210 |

* cited by examiner

Primary Examiner—Gabrielle Brouillette
Assistant Examiner—Monique Wills
(74) Attorney, Agent, or Firm—I. Zborovsky (57) ABSTRACT

An electrical battery has a plurality of pairs each including a positive active mass arranged in an impermeable horizontally located cuvette with an open upper surface, and a negative active mass arranged in an impermeable horizontally located cuvette and having an upper lower working surface with the second mentioned cuvette located above the first mentioned cuvette, the pairs being located one above the other, an electrolyte in which the cuvettes with the active masses are located, and means for electrically connecting in series the pairs of the cuvettes located one above the other.

13 Claims, 8 Drawing Sheets

ELECTRICAL ENERGY GENERATION

BACKGROUND OF THE INVENTION

The present invention relates to electrical energy generation and can be used in devices with transportable and non-transportable electrical energy sources with high efficiency, high service life and short charging time.

Current sources of electrical energy use lead batteries which usually contain two grate plates of lead-antimony alloy, with the grades filled with a paste lead oxide mixed with water. Identical plates are immersed in a vertical position in electrolyte which is aqueous solution of sulphuric acid. As a result of a reaction, the lead oxide after a certain time is converted into lead sulphide. When electric current passes through the battery from an outside current source during charging, negative ions move to the anode and transform the lead sulphide into lead dioxide. Positive hydrogen ions move toward the cathode and reduce the lead sulphide to a metallic lead. When electric current passes through, the plate becomes asymmetrical. On one of the plates the lead sulphide on the negative pole is transformed into sponge lead, on the other plate the lead sulphide on the positive pole is transformed into lead dioxide, and the battery is charged. Thus, a galvanic pair is formed which can be a source of electric current. The electric motor source of such a battery with full charge is increased to two volt. When such a battery is connected as a source of electric current to an outside load, it will discharge and the processes take place in an opposite direction. At the end of the discharge, both plates are covered with identical layers of lead sulphide and the electric motor force drops to zero. However, in practice at the end of the discharge the electric motor discharge does not decrease lower than 1.85 volt, since the battery is destroyed at a greater charge. Usually batteries with electric motor force of 12 volts and not 2 volts are not utilized, since such a battery has an energy six times greater than that of the lead battery of two volts. In order to obtain the electromotive source of two 12 volts, six batteries are connected electrically with one another in series. The problems which occur in the battery of 12 volts are determined by those of each battery of two volts.

Capacity which can be obtained from the lead battery, depends on the quantity and porosity of the positive active mass, on the quantity and porosity of the negative active mass, and the quantity and concentration of electrolyte as well as on the construction of the battery. The conventional batteries have a relatively short service time, low capacity and a long time of battery discharge, low weight of positive active mass when compared with the weight of the grates composed of the alloy, in which the positive active mass is accommodated. In the service life of the lead battery depends on service life of positive great plates due to the corrosion of metal grates and melting of positive active mass. The grate plates of the positive electrode have a direct contract with the electrolytes. When electric current passes through the battery during charging, negative ions $SO_4^{---}$ $O^{--}$ moved toward the metal grate and actively interact with the metal of the grates and the grates are destroyed. Another factor which limits the service life of the batteries is melting (reduction) of positive active mass $PbO_2$. The service lives can be increased by creating in the positive active mass of a porous structure. However, the melting of the positive active mass is so intense that the battery becomes inoperative in a short time. Even with a low quantity of pores, this negative effect takes place. The increase of charge current also leads for formation of porous BO2 which reduces the service life of the batteries. Because of this, the value of the charging current in such batteries is limited and the time of charging is very long.

In order to reduce melting of the positive active mass, the battery is provided with special separators, which however do not complete prevent the melting of positive active mass, and on the other hand reduce the capacity of the battery. The separators also increase the inner ohmic resistance of the battery, makes difficult access of acid to the plates, and replaces a substantial volume of acid and therefore reduces its quantity in the battery. The grater is current density of battery discharge, the grater is voltage drop during passage of current along an inner surface through the separators, the grater part of common voltage dropped without use. During discharge with a great current density, a consumption of acid per time unit is high. Due to the diffusion the required quantity of acid does not pass through the pores of the separator, discharge is provided mainly by the stored acid in the pores of the plate. However, the quantity of the pores in the positive active mass is low and as a result the capacity of the battery is low. Thus, the melting of the positive active mass is a factor which limits the service life and capacity of known lead batteries.

U.S. Pat. No. 4,964,878 discloses a battery in which the plates are located horizontally. However, the battery contains the same elements of conventional batteries, in which the plates are located vertically and which negatively affect the parameters of the battery. The battery disclosed in this reference also has grates of lead-antimoni alloy with positive active mass in its cells. The separators are utilized. The active mass, which is even worse than in known batteries is located directly on the separator of porous material. The service life of this battery is limited by corrosion of the grates which loose its strength and increases electrical resistance. The positive mass located in the corroded cells is also melted. In this battery there is even more intense melting of the positive active mass, and the capacity of the battery as well as the service life of the battery is reduced. Therefore this battery is not possible to use a loose positive mass as in conventional batteries. In an attempt to reduce the degree of penetration of the positive active mass through the pores of the separator, the reference proposes to use separators in three layers. This however reduces the capacity of the battery, increases the inner resistance, makes difficult access of sulphuric acid to the plates, replaces a substantial volume of sulphuric acid.

SUMMARY OF THE INVENTION

Accordingly, it is an object of the present invention to provide an electrical battery of the above mentioned type, which avoids the disadvantages of the prior art.

In keeping with these objects and with others which will become apparent hereinafter, one feature of present invention resides, briefly stated, in an electrical battery which has a positive active mass accommodated in a horizontally located cuvette with an open upper surface, a negative active mass located in another horizontal cuvette and having an open lower surface, with the second cuvette located on top of the first cuvette, and the cuvettes are accommodated in an electrolyte, and the battery contains a plurality of pairs of the above mentioned cuvettes, and the pairs are connected electrically in series with one another.

Preferably, the cuvettes are composed with plastic and do not interact with a solution of electrolytes. A bottom of the plastic cuvette for the negative active mass is a grate with a small wall size when compared with a whole size to provide a free penetration of electrolyte through the bottom into a space between the positive active mass and the negative active mass. The sickness of the great-like bottom of the cuvette for negative active mass determines a distance between the upper surface of the positive active mass and the lower surface of the negative active mass. The cuvettes have relatively thick peripheral vertical walls and therefore are stably arranged on one another to form a single block, while the bottom is thin to provide a low weight. The utilized plastic material reduces the weight of the battery.

The lead plate of the negative electrode has a system of windows, in which two windows are filled with paste for forming the negative active mass and the third one is free for passage of electrolytes into the space of the positive active mass and the negative active mass and flows under the windows filled with the paste from all sides.

A great quantity of the electrolyte for the lower pair of the active mass is determined by a space above these pairs, which is formed by high legs of the upper cuvette with the positive active mass which stand on the cuvette with positive active mass of the lower pair.

Both positive and negative active mass has admixtures providing expanding action in order to form during charging and discharging a loose, porous structure of the active mass, to increase the capacity of the battery. A substantial quantity of electrolyte under the cuvette with the positive active mass and easiness of its penetration into a space between the lower positive and negative active mass together with the loose porous structure of the active masses provides a greater capacity of the battery, while a small space between the positive and negative active masses determined by the thickness of the great-like cuvette bottom for the negative active mass, provides a low inner resistance to current passing through electrolytes between the upper surface of the positive active mass, between the upper working surface of the positive active mass and the lower working surface of the negative active mass. Current does not pass through the great quantity of electrolytes located under the cuvette with the legs with the positive active mass.

The plastic cuvette which accommodates the positive active mass is located horizontally and therefore melting of the positive active mass is completely excluded. As a result, it is possible to operate with high currents which creates loose porous structure for the positive active mass and provides a great capacity of the battery. The possibility to charge the battery with high currents results in a short charging time of 15–20 minutes. Since the cuvette is located horizontally, the melting of the positive active mass is excluded and it is therefore possible to introduce admixtures for expansion purposes, which during charging and discharging produce loose porous structure with resulting high capacity of the battery.

The horizontally located cuvettes which are assembled in the block and tied together by a plastic belt are introduced into a vessel of acid-resistance material, electrolyte is poured into it and the vessel is disclosed in the covered and hermetized.

Each cuvette on the periphery has several vertical recesses, so that when they are assembled in a block, a vertical passage going from top to bottom is provided between the block and a lower wall of the vessel. Electrolyte freely flows through this passages to the whole depth of the block. For electrical current at the bottom of the cuvette under the layer of the positive active mass, a lead collector is located, and the collector does not have a direct contact with electrolyte. On the other hand, the whole positive active mass participates in the process of charging-discharging, since electric current which passes through the electrolyte and collector also passes through the whole thickness of the loose porous positive active mass.

In order to take voltage from the collector for positive active mass and for charging and discharging from the exterior current source, a contact electrode plus is utilized. For withdrawing voltage from the collector for the negative active mass and for and charging and discharging from an external current source, a contact electrode minus is utilized.

In order to increase the out voltage, the subsequent pairs in the horizontal cuvettes located one above the other are connected in series with each other by contact electrodes.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
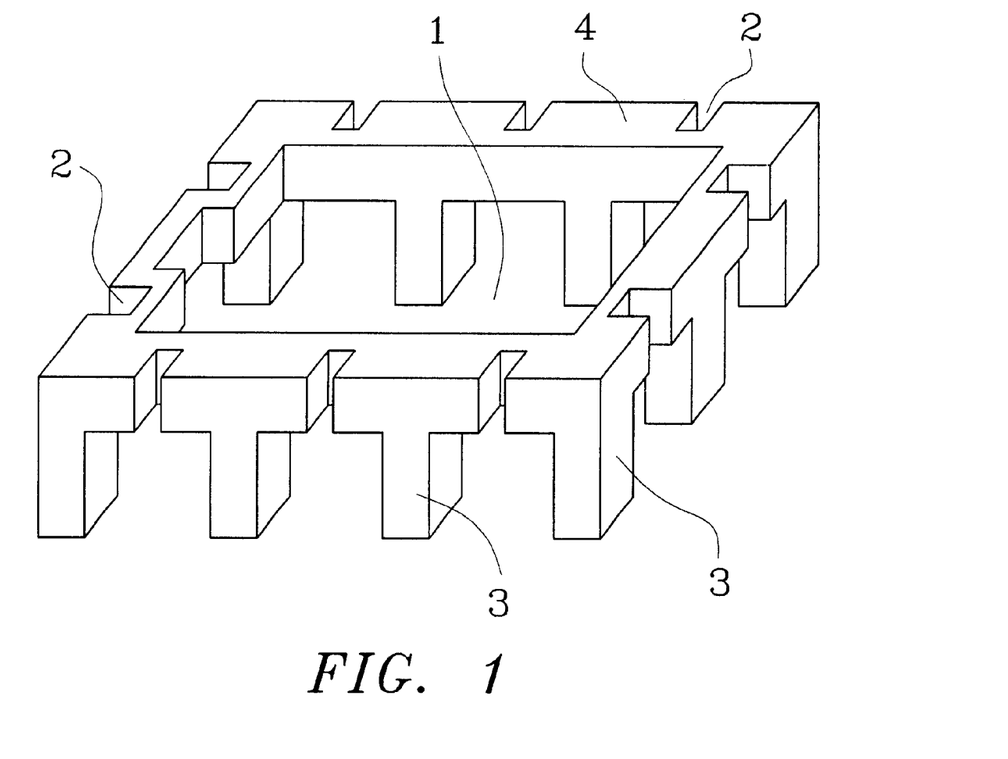
FIG. 1 is a view showing a cuvette for a positive active mass of an electrical battery in accordance with the present invention.
Figure 2:
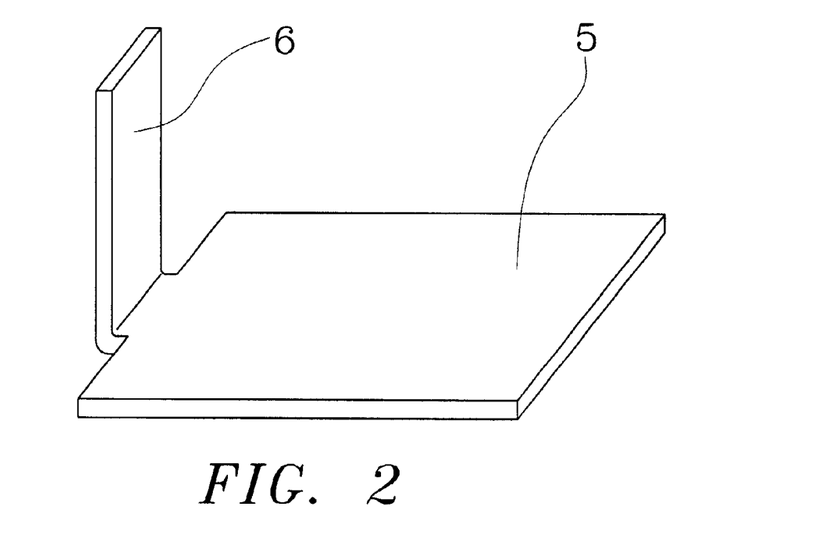
FIG. 2 is a view showing a collector for the positive active mass of the inventive electrical battery.
Figure 3:
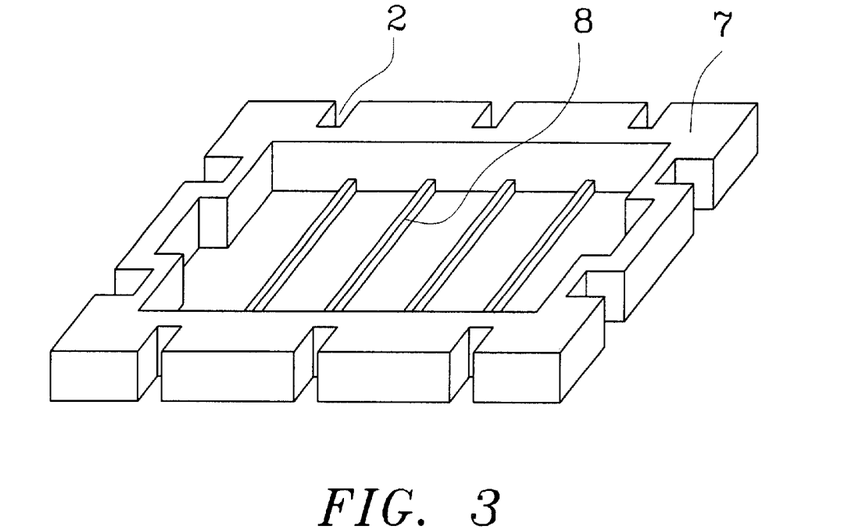
FIG. 3 is a view showing a cuvette for a negative active mass of the inventive electrical battery.

An electrical battery in accordance with the present invention has an impermeable, plastic cuvette which is located horizontally. A collector 5 composed of lead is arranged in a recess 1 of the horizontally located cuvette on the bottom. In order to withdraw voltage for discharge and charge from an external current source, a contact electrode 15 plus 6 is used. As shown in FIG. 8, a layer of a positive active mass 15 is located above the contact electrode 5 and has an open upper working surface. Such a location of the positive active mass excludes a contact of the lead collector directly with the electrolyte. Another plastic cuvette for accommodating a negative active mass is located above the horizontal cuvette with the positive active mass as shown in FIG. 3. The bottom of the plastic cuvette for the negative active mass is formed as a grate 8 with small wall sizes as compared with the sizes of openings, so as to provide a free penetration of electrolytes through the bottom of the cuvette into the space between the positive active mass and the negative active mass. The thickness of the grate-like bottom of the cuvette for negative active mass shown in FIG. 10 determines a distance between the upper working surface of the positive active mass 15 (for example lead dioxide) and the lower working surface of the negative active mass 13 in FIGS. 4 and 10 (porous lead). The cuvettes have relatively thick peripheral vertical walls 4 shown in FIGS. 1, 3, and 7. As a result the stand stabily one on the other so as to form a block-housing. At the same time the bottom is thin to reduce weight. The weight is also reduced when its plastic is a light weight material.

Figure 4:
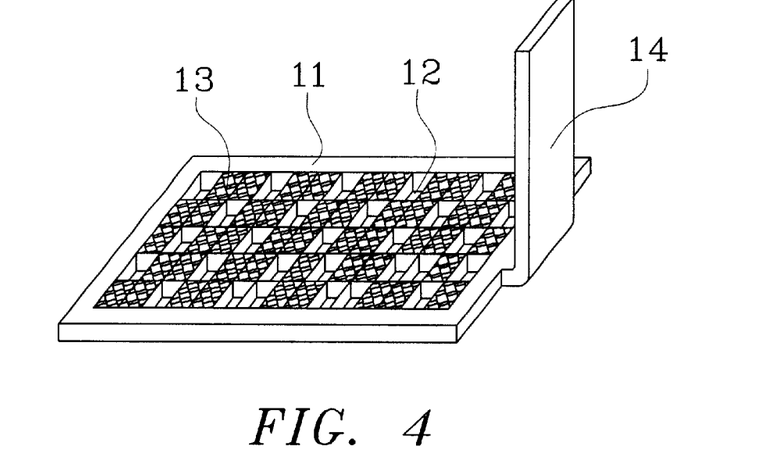
FIG. 4 is a view showing a lead plate with a negative mass of the inventive electrical battery.
Figure 9:
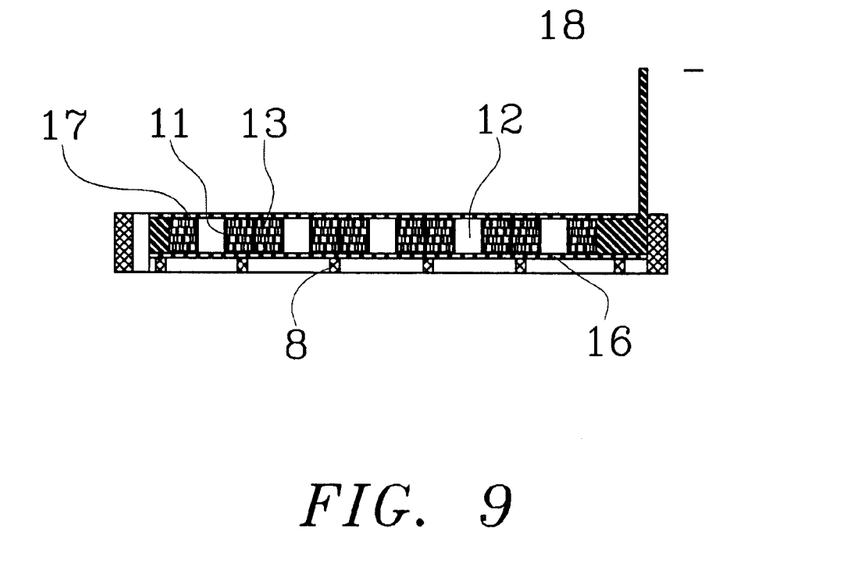
FIG. 9 is a view showing a longitudinal cross-section of the cuvette with the negative active mass of the inventive electric battery.
Figure 10:
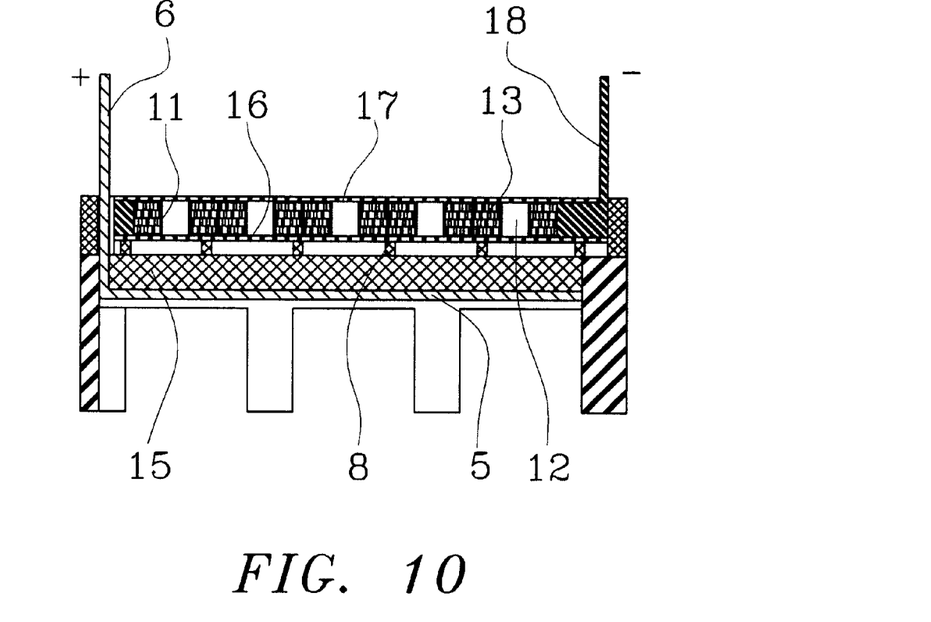
FIG. 10 is a view showing a transverse cross-section of two cuvettes filled with positive and negative active masses.
Figure 11:
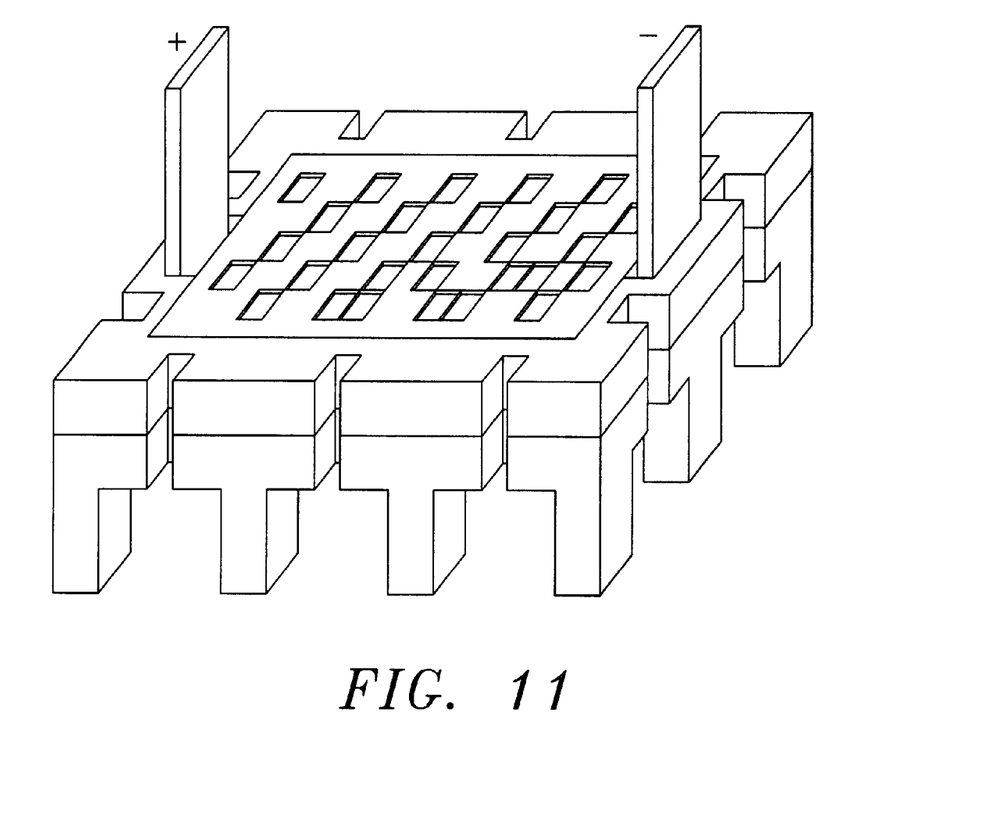
FIG. 11 is a perspective view of two cuvettes with positive and negative active masses.

FIG. 4 shows the lead plate of the negative electrode which has the system of windows. Successively two windows are filled with pins for forming the negative active mass 13, and the third window 12 is free for passage of electrolyte into a space between the positive active mass and the negative active mass. The electrolyte also passes under the windows filled with the paste from all sides. As shown in FIG. 9, you have to completely exclude the possibility of getting of particles of sponge lead on the positive active mass under the lead plate 1, a thin spacer 11 of glass fabric is arranged directly on the bottom of the grate-like cuvette 8. Both cuvettes as shown in FIGS. 10 and 11 are arranged in a pair in an electrolyte which represents a solution of sulphuric acid. Such a pair in a charge condition provides voltage of two volt.

Figure 12:
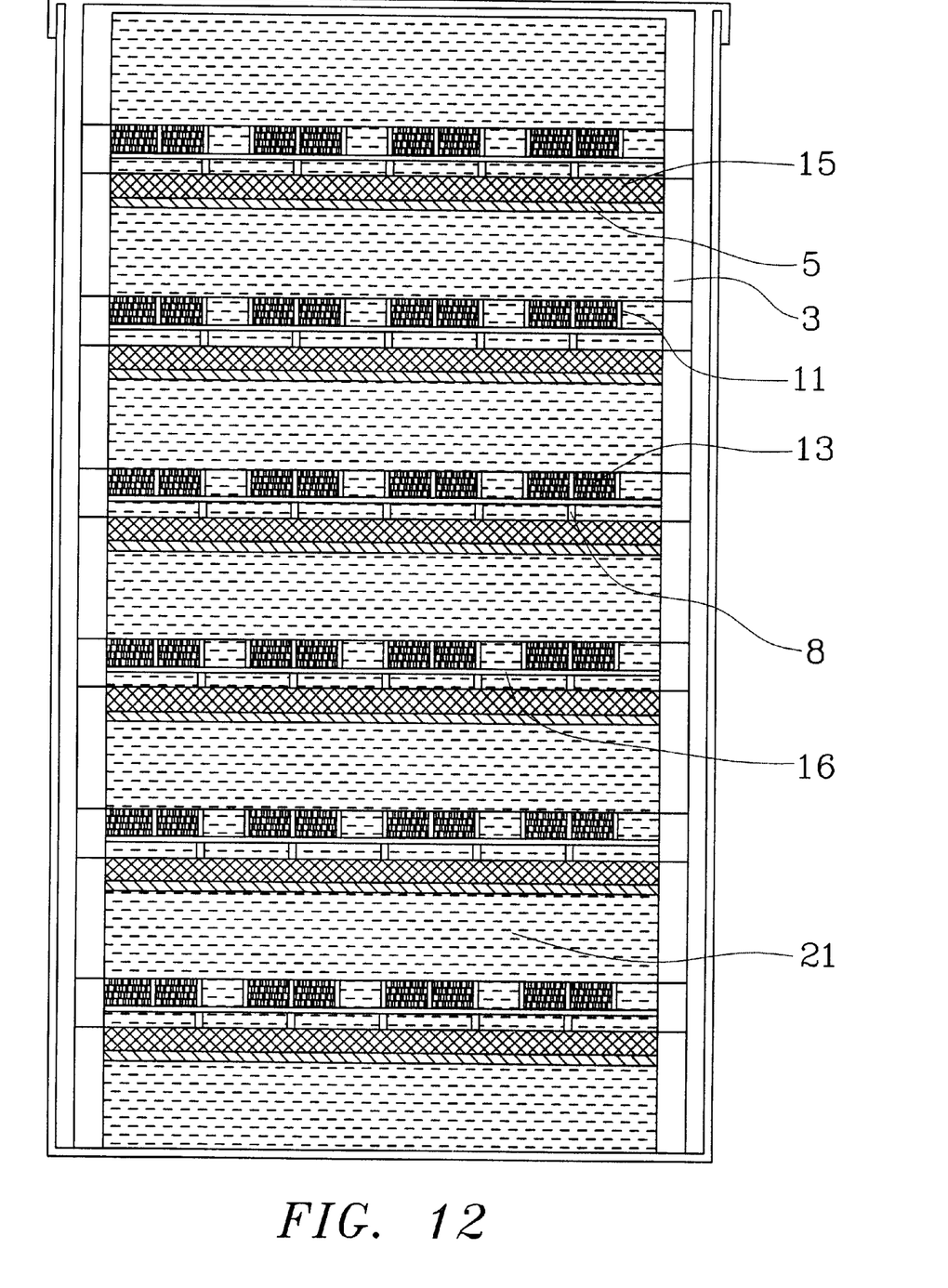
FIG. 12 is a view showing a transverse cross-section of the electrical battery in accordance with the present invention with a connection in series.

As shown in FIG. 12, in order to provide a higher output voltage, subsequent pairs of the horizontally located cuvettes are arranged one on the other and connected with each other electrically in series. A great quantity of electrolyte provides a great capacity of the battery, and for the lower pair of the active mass is determined by a space above these pairs, which is formed by high legs 3 in FIG. 3 by the upper cuvette with the positive active mass which stands on the lower pair on the cuvette with the negative active mass.

Since the active masses are located in horizontal cuvettes as shown in FIG. 10, from which melting of the active mass is completely excluded, there is a possibility to introduce into the positive active mass a negative active mass expanding admixtures, in order to form a loose porous structure for the negative active mass and especially for positive active mass during charging and discharging. This provides a greater capacity of the battery.

A great quantity of electrolytes under the cuvette with the positive active mass and easiness of its penetration into a space between the positive and negative active masses located below together with the loose porous structure of the active masses provides a greater capacity of the battery. A small distance between the positive and negative active masses determined by the thickness of the great-like button 8 in FIG. 3 and FIG. 9 of the cuvette for the negative active mass, provides a lower inner resistance to passage of current through the electrolyte between the upper working surface of the positive active mass and a lower working surface of the negative active mass. It is important to know that electric current does not pass through the great quantity of electrolytes located under the cuvette with the legs with the positive active mass.

Figure 7:
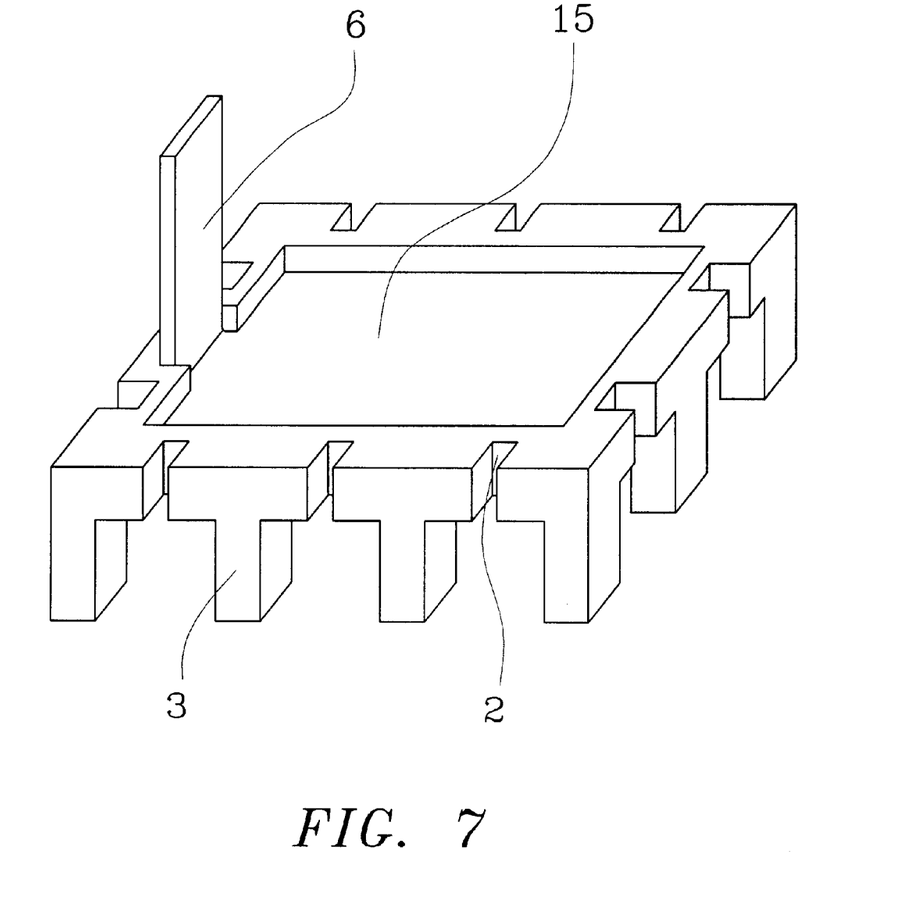
FIG. 7 is a view showing a cuvette with the positive active mass with the inventive electric battery.
Figure 8:
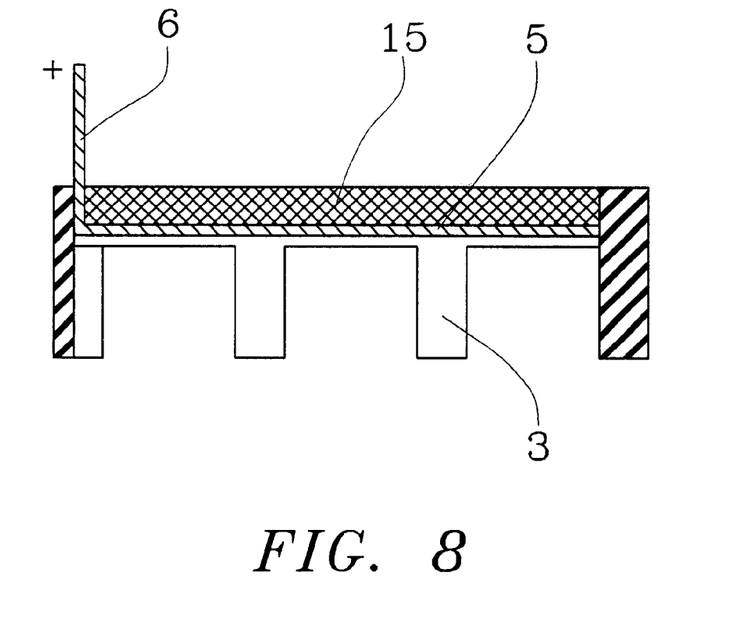
FIG. 8 is a view showing a longitudinal cross-section of the cuvette with the positive active mass of the inventive electric battery.

As shown in FIG. 7, the plastic cuvette in which the positive active mass 15 is accommodated, it is located horizontally and therefore completely excludes melting of the positive active mass. As a result, it is possible to discharge the electrical battery with high currents so as to form loose, porous structure for positive active mass and therefore a great capacity of the battery is provided. The possibility of discharging with high currents results in a very short time of discharge of 15–20 minutes.

Figure 13:
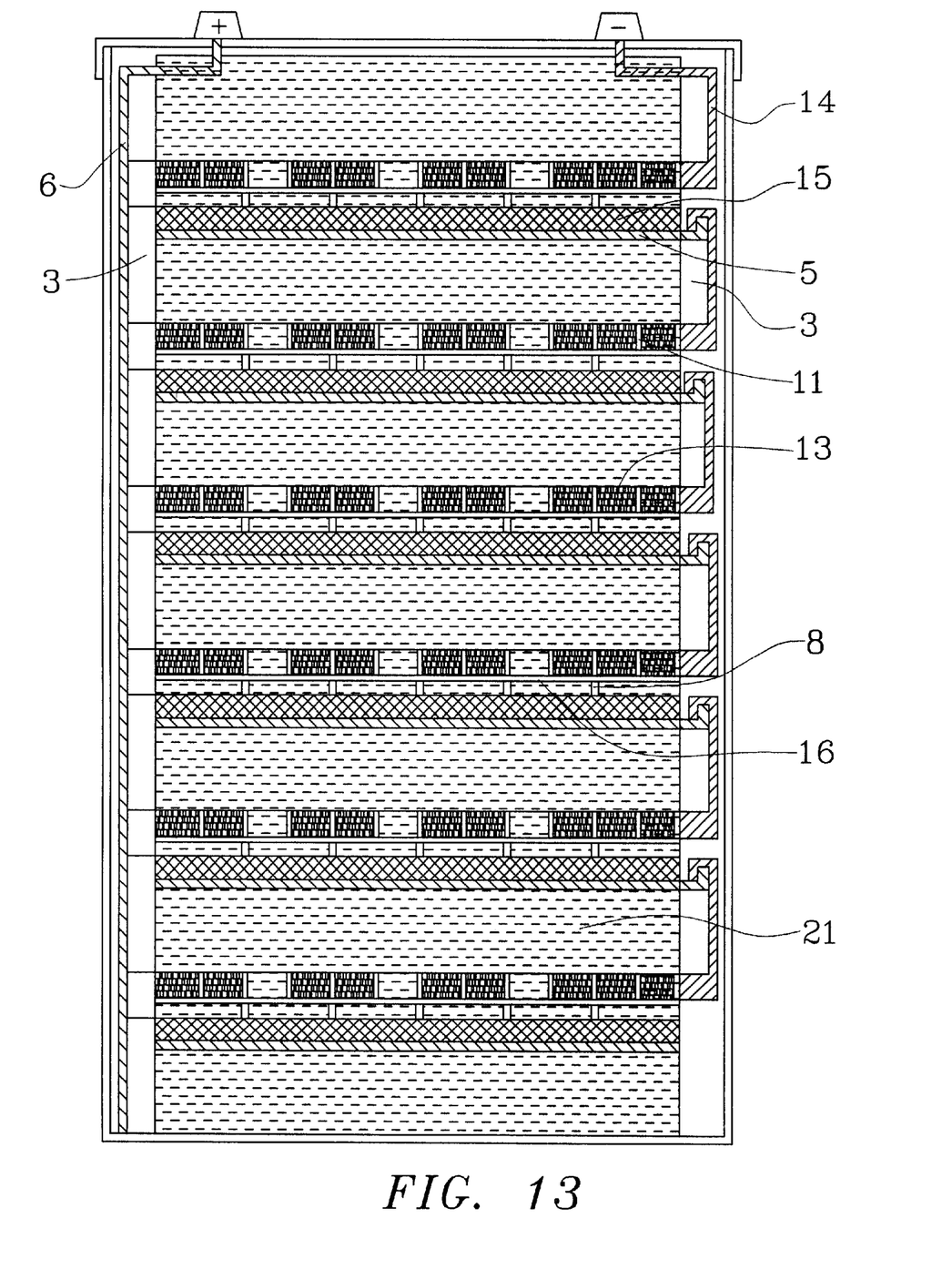
FIG. 13 is a view showing a longitudinal cross-section of the electrical battery of the present invention with a connection in series.
Figure 14:
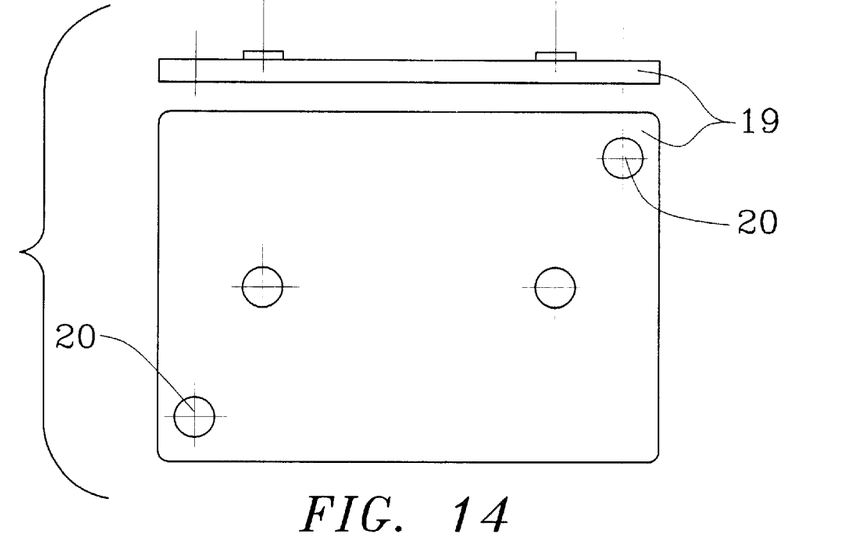
FIG. 14 is a view showing a cover of the vessel of the electrical battery.
Figure 15:
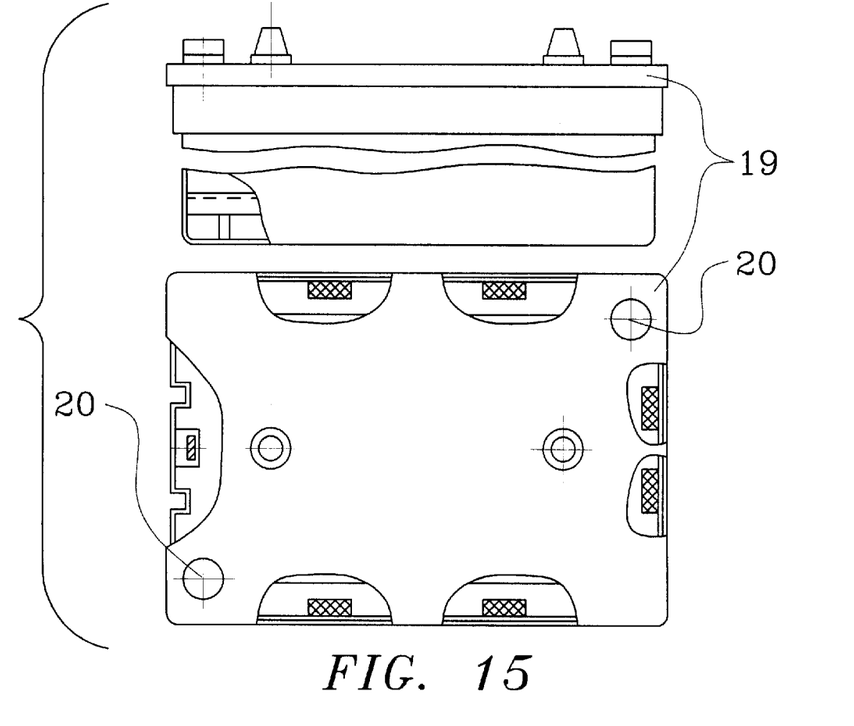
FIG. 15 is an external view of the inventive electrical battery.

As shown in FIGS. 13 and 15, the horizontal cuvettes located one above the other and tied together by a plastic belt are assembled in a block and introduced into a vessel acid-resistant material, which is closed by a cover 19 and is hermatically packed by sealing the cover with a sealant. Then, from one of the openings 21 an electrolyte is poured into the vessel. The second opening serves for discharge of air during pouring in of the electrolyte through the first opening. Each cuvette along its periphery has several vertical recesses 2, so that when the cuvettes are assembled in a single block, vertical passages going from the top to the bottom between the block and the lower wall of the vessel are provided. Electrolytes which fills the vessel completely flows through these passages and completely penetrates through the whole depth of the block.

For providing electrical contact, under the layer of the positive active mass 15, a lead collector 5 is arranged on the bottom of the cuvette. Therefore, there is no direct contact of the collector with the electrolyte. On the other hand, since the collector 5 is located this way relative to the positive active mass, all positive active mass participates in the charging-discharging since the electric current passes through the electrolyte and collector and inevitably passes also through the whole thickness of the loose porous positive active mass.

In order to take voltage from the collector for positive active mass and for discharging and charging from an external current source, the contact electrode plus 6 is utilized. For taking voltage from the collector for negative active mass and for charging and for charging and discharging from an exterior current source, a contact electrode minus 14 is utilized.

As shown in FIG. 12, in order to increase the output voltage, the subsequent pairs of horizontal cuvettes located above one above the other are connected in series with one another by contact electrodes.

Figure 5:
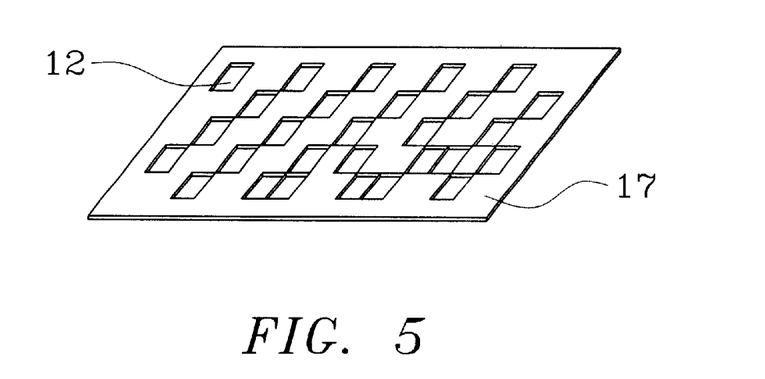
FIG. 5 is a view showing a plastic cover preventing contact with electrolytes with the inventive electrical battery.
Figure 6:
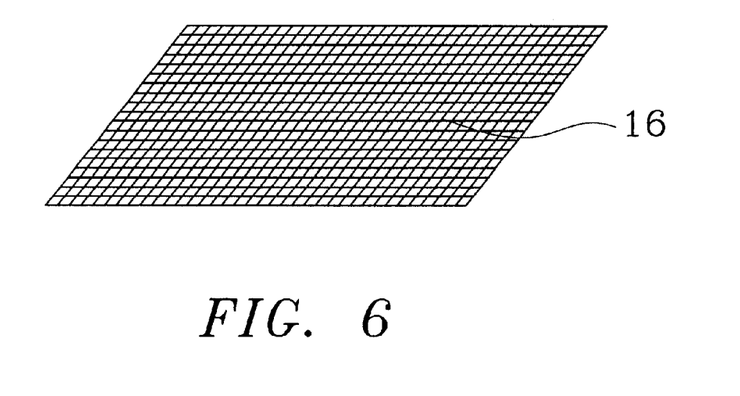
FIG. 6 is a view showing a spacer of the inventive electric battery.

In order to protect the upper surface of the lead plate 11 in FIG. 4, it is covered from above by a thin layer of plastic in FIG. 5 with openings 12, 20 for passage of electrolyte. For negative active mass, the working surface is the lower surface.

It will be understood that each of the elements described above, or two or more together, may also find a useful application in other types of constructions differing from the types described above.

While the invention has been illustrated and described as embodied in electrical energy generation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. An electrical battery, comprising a plurality of pairs each including a positive active mass arranged in an a located cuvette with an open upper surface, and a negative active mass arranged in a horizontally located cuvette and having an upper lower working surface with the second mentioned cuvette located above the first mentioned cuvette, said pairs being located one above the other; an electrolyte in which said cuvettes with said active masses are located; means for electrically connecting in series said pairs of said cuvettes located one above the other, wherein said cuvettes being assembled with one another; a vessel composed of an acid resisting material in which assembled cuvettes are accommodated and in which the electrolyte is contained, each of said cuvettes having a plurality of recesses located on its periphery, so that when said cuvettes are assembled in a block, a plurality of vertical passages are provided between said cuvettes and an inner wall of said vessel for free passage of electrolyte along a whole depth of said block.

2. An electrical battery, comprising a plurality of pairs each including a positive active mass arranged in an a located cuvette with an open upper surface, and a negative active mass arranged in a horizontally located cuvette and having an upper lower working surface with the second mentioned cuvette located above the first mentioned cuvette, said pairs being located one above the other; an electrolyte in which said cuvettes with said active masses are located; means for electrically connecting in series said pairs of said cuvettes located one above the other; a negative electrode having a plate with a system of windows, in which two windows are filled with a paste for forming the active mass and a third window is free for passage of electrolytes between the positive active mass and the negative active mass.

3. An electrical battery, comprising a plurality of pairs each including a positive active mass arranged in an a located cuvette with an open upper surface, and a negative active mass arranged in a horizontally located cuvette and having an upper lower working surface with the second mentioned cuvette located above the first mentioned cuvette, said pairs being located one above the other; an electrolyte in which said cuvettes with said active masses are located; means for electrically connecting in series said pairs of said cuvettes located one above the others said cuvette with positive active mass having lower legs with which it stands on said cuvette with negative active mass located below, to form a space of electrolytes.

4. An electrical battery as defined in claim 1, wherein said cuvettes are composed of plastic.

5. An electrical battery as defined in claim 1, wherein said cuvette for positive active mass has a bottom which is formed as a grate for free passage of electrolytes through said bottom.

6. An electrical battery as defined in claim 5, wherein said grate has a size of one inch by one inch and a wall thickness of 0.05 inch.

7. An electrical battery as defined in claim 5, wherein said bottom of said cuvette for positive active mass is located between said upper surface of the positive active mass and said upper working surface of said positive active mass and said lower working surface of said negative active mass to determine a distance between said active masses.

8. An electrical battery as defined in claim 5, wherein said cuvettes have thick peripheral walls substantially of one half inch and stand on one another to form a stable block, while said bottom is thin to reduce a weight of the electrical battery.

9. An electrical battery as defined in claim 1, wherein said positive active mass has mixtures providing expansions to form a loose sponges structure of the positive active mass.

10. An electrical battery as defined in claim 1; and further comprising a cover for tightly sealing closing said vessel.

11. An electrical battery as defined in claim 1; and further comprising a contact electrode located on a bottom of said cuvette for positive active mass under the positive active mass to prevent contact of said contact electrode with said electrolyte.

12. An electrical battery as defined in claim 1; and further comprising a positive contact electrode provided for taking voltage from a collector said positive active mass and for charging and discharging; and a negative contact electrode for taking voltage from a collector for taking voltage from a collector for negative active mass and for charging and discharging.

13. An electrical battery as defined in claim 12; and further comprising contact electrodes which connects electrode pairs with one another in series.

* * * * *